United States Patent
Weldy

(10) Patent No.: US 6,771,311 B1
(45) Date of Patent: Aug. 3, 2004

(54) AUTOMATIC COLOR SATURATION ENHANCEMENT

(75) Inventor: John A. Weldy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 779 days.

(21) Appl. No.: 09/734,386

(22) Filed: Dec. 11, 2000

(51) Int. Cl.[7] ............................................. H04N 5/228
(52) U.S. Cl. ..................................... 348/222.1; 348/647
(58) Field of Search ................................. 348/647, 648, 348/649, 557, 207.91, 222.1, 223.1, 229.1, 253, 254, 255, 256, 267, 268, 239, 645; 382/162, 163, 167, 254; 358/505, 506, 518, 519, 520, 521

(56) References Cited

U.S. PATENT DOCUMENTS

| | | |
|---|---|---|
| 4,677,465 A | 6/1987 | Alkofer |
| 4,729,016 A | 3/1988 | Alkofer |
| 4,984,071 A | 1/1991 | Yonezawa |
| 5,062,058 A | 10/1991 | Morikawa |
| 5,265,200 A | 11/1993 | Edgar |
| 5,398,123 A * | 3/1995 | Katsuma ...................... 358/518 |
| 5,517,335 A * | 5/1996 | Shu ............................. 358/518 |
| 5,555,022 A | 9/1996 | Haruki et al. |
| 5,673,336 A | 9/1997 | Edgar et al. |
| 5,796,874 A | 8/1998 | Woolfe et al. |
| 5,798,801 A * | 8/1998 | Skinner ...................... 348/645 |
| 5,812,286 A | 9/1998 | Lin |
| 5,990,950 A * | 11/1999 | Addison ..................... 348/273 |
| 2001/0022816 A1 * | 9/2001 | Bakhmutsky et al. .. 375/240.17 |

* cited by examiner

Primary Examiner—Tuan Ho
(74) Attorney, Agent, or Firm—William F. Noval

(57) ABSTRACT

A method of processing a digital color image comprising the steps of: providing a digital color image having pixels and a plurality of color channels; processing the image to provide a channel independent restored digital image; determining at least one predictor derived from the channel independent restored digital image or the digital color image; determining a channel interdependent color boost relationship from the at least one predictors; and applying the color boost relationship on a pixel by pixel basis to the respective channels of the digital color image to produce a processed digital color image.

17 Claims, 2 Drawing Sheets

AUTOMATIC COLOR SATURATION ENHANCEMENT

FIELD OF THE INVENTION

The present invention relates to methods of processing digital color images, and more particularly to a method of adjusting the color saturation of a digital color image.

BACKGROUND OF THE INVENTION

In photographic printing of film, such as a color photographic negative, it is a well-known practice to 'correct' the color balance by causing the overall color balance of the print to be a shade near gray. This correction strategy is based on the assumption that the overall average of the scene integrates to a gray color and is very effective at reducing the effects resulting from different scene illuminants that are spectrally different such as tungsten and daylight. In a like manner, image sensing apparatus such as a video camera, average, over a time period, color difference signals, R-Y and B-Y, to a zero value. This is equivalent to integrating to gray.

These methods work well for the majority of scene and illuminant combinations. However, when the scene subject matter is highly colored, particularly with a single dominant color, the integrate to gray strategy fails as this dominant scene color is mistaken for an illuminant bias. This failure, known as subject failure, produces unpleasant colored casts in the color complimentary to the dominant scene color. There are various strategies for minimizing these failures. These strategies are typically based on reducing the amount of correction based on a population of images and/or on the information in neighboring frames. Other color problems result from fading of the dyes in a photographic image, printing and processing errors, film keeping problems, and in the case of a color digital image that is captured directly with an electronic camera, a misadjusted black point in the camera.

With a digital image, obtained either directly from an electronic camera, or indirectly by scanning a photographic print or film, it is possible to manually adjust the color balance by using any of the well known digital photographic manipulation tools such as Adobe Photoshop®. However, manual adjustment is not practical for automated printing of digital images. A digital image provides much information that can be used for calculating color adjustments, and several methods have been proposed for performing these adjustments automatically. Some of these methods, such as that taught in U.S. Pat. No. 5,555,022, issued Sep. 10, 1996 to Haruki et al. divide the scene information into a plurality of regions representing different locations within a scene. Means to select and weight the correction of these blocks are then employed to provide automatic white balancing and to restrict the degree to which color correction gain is applied. Yonezawa, U.S. Pat. No. 4,984,071 teaches a method for adjusting a gradation curve based on identifying shadow and highlight points by utilizing histogram data. Morikawa, U.S. Pat. No. 5,062,058 describes a system that uses a cumulative histogram to designate highlight and shadow points. Other histogram-based methods are taught by Lin, U.S. Pat. No. 5,812,286 and Edgar, U.S. Pat. No. 5,265,200. Edgar further describes a method performing a second order best fit regression of the histogram data and includes methods to eliminate some histogram values from consideration in the regression.

Another approach that combines color correction with tone scale corrections is based on random sampling within a digitized image and subsequently modifying the resulting histogram of these samples. U.S. Pat. No. 4,677,465, issued Jun. 30, 1987 to Alkofer and U.S. Pat. No. 4,729,016, issued Mar. 1, 1988 to Alkofer disclose relatively complex methods that utilize these samples in a plurality of segmented contrast intervals through normalization techniques and with comparison to image population data.

An improved method for simultaneously adjusting color scale and color balance was disclosed in U.S. patent application Ser. No. 09/650,422, filed Aug. 29, 2000, that preferably calculates gain and offset factors by regressing masked red, green, and blue digital image data to a masked reference digital image.

While the above described methods can correct for tone scale, they do not provide method or means for enhancing color degradation resulting from the loss of color purity or color saturation. This type of color degradation can be restored if channel interdependent image processing, such as a 3×3 color matrix, is applied.

U.S. Pat. No. 5,796,874 by Woolfe et al. describes an approach that is specifically designed to correct for dye-fade in Ektacolor paper includes generating a 3×3 restoration matrix that can compensate for this loss of purity or color saturation. The disclosed restoration matrix is a matrix of coefficients of second order polynomials in time, with factors that are optimized for specific paper, are applied in logarithmic space, and which compensate for the image-wise light filtration from overlying layers in the film. The compensation matrix is followed by tone-scale adjustments. This method assumes that additional information, time and type of photographic material, are known. This information is oftentimes not available. In addition, parameters other than time, such as temperature and light exposure, can impact stability and long term purity of dye images.

Another method to generate a color restoration matrix is taught by Edgar, U.S. Pat. No. 5,673,336, wherein determining the correlation of the noise in the digital image is used to generate and apply a decorrelating matrix to restore the image. This method has the advantage that it does not require any additional information on the pedigree of the image; however, it assumes that there is a detectable noise signal, that this noise signal is not contaminated with image signal, and that in the original, non-degraded image, the image noise was fully decorrelated and was of near equal power levels amongst the channels. It is difficult, or in many cases impossible, to guarantee that these assumptions are met.

It has been further observed that when digital images of dye faded images have been processed through many of the above methods that provide both gain and offset tone scale corrections to each channel that a uniform color boost among the color channels, color boost, in which a color restoration matrix with all diagonal terms equal and with all off-diagonal terms equal, is effective at restoring color saturation. One embodiment of the method taught by Katsuma in U.S. Pat. No. 5,398,123 uses such a uniform boost to increase color saturation. Katsuma teaches a method and apparatus to increase color saturation wherein at each pixel, the difference between the maximum value amongst a plurality of color components at that pixel and the minimum value amongst a plurality of color components at each pixel is calculated. These calculated differences for each pixel are averaged for the entire image, and if this average exceeds a threshold, a correction factor, based on the dynamic range of the image and this average, is applied to the image as a uniform saturation boost. This saturation boost is applied as a global change, that is, every pixel is subjected to the same image processing. He notes that this operation can result in overflow problems and solves these problems by mapping overflow in any of the color components at any pixel to the maximum or minimum value supported by the image processing means, e.g. 255 and 0 respectively for an 8 bit per color component imaging system. Furthermore, his method requires that an operator select the above-mentioned dynamic range at the initial step in the enhancement process.

In a similar approach to enhance color saturation, Shu in U.S. Pat. No. 5,517,335 teaches a method wherein at each pixel, the maximum value and the minimum value amongst a plurality of color components are calculated. His method differs from that disclosed by Katsuma in that Shu calculates a modification to each pixel based on only the color component values at that pixel. The difference between the maximum and minimum value at a pixel and the average of the code values for all of the color component values at that pixel are inputted into their respective look up tables and the product of the output from these look up tables forms a delta value. He notes that this delta value is multiplied by a predetermined constant that allows the effect of the enhancement to be varied to suit a particular image. The saturation of the image is enhanced by subtracting this delta from the color component with the minimum value at that pixel and adding this delta to the color component with the maximum value, thus preserving the average amongst the color components. Shu notes that overflow problems can occur and solves these problems by designing the look up tables so as to minimize these problems.

Both the method of Katsuma and the method of Shu base their color saturation increase, i.e. color restoration on values, at any pixel, from only two color channels. This can result in biases if the third color, in the case of a three color red, green, and blue digital image, is very close in value to either of the two values that are used in determining the color restoration, then the overflow problem noted above is exacerbated. In contrast to the uniform boost methods, the method of Shu, if the value from the third, unused color value is close to either of the used maximum or minimum values, then hue shift will occur as only these two colors are modified, when all three must be modified in order to maintain color hue.

To date, none of these techniques for modifying color saturation have proven entirely satisfactory in addressing the problem of automatically restoring color purity in a digital image, particularly where the digital image has been derived by scanning an image that has experienced severe dye fade.

There is a need, therefore, for an improved digital image processing method for automatically adjusting the color balance of a digital image.

SUMMARY OF THE INVENTION

The need is met according to the present invention by providing a method of processing a digital color image having pixels and a plurality of color channels, comprising the steps of: processing the image to provide a channel independent restored digital image; determining at least one predictor derived from the channel independent restored digital image or the digital color image; determining a channel interdependent color boost relationship from the at least one predictors; and applying the color boost relationship on a pixel by pixel basis to the respective channels of the digital color image to produce a processed digital color image.

The present invention has the advantages that it does not require knowledge of the pedigree of the image, that it is computationally efficient, and that it avoids the problems of generating pixel value overflow, selecting dynamic range, selecting image type, and/or creating color hue shifts.

DETAILED DESCRIPTION OF THE INVENTION

Figure 1:
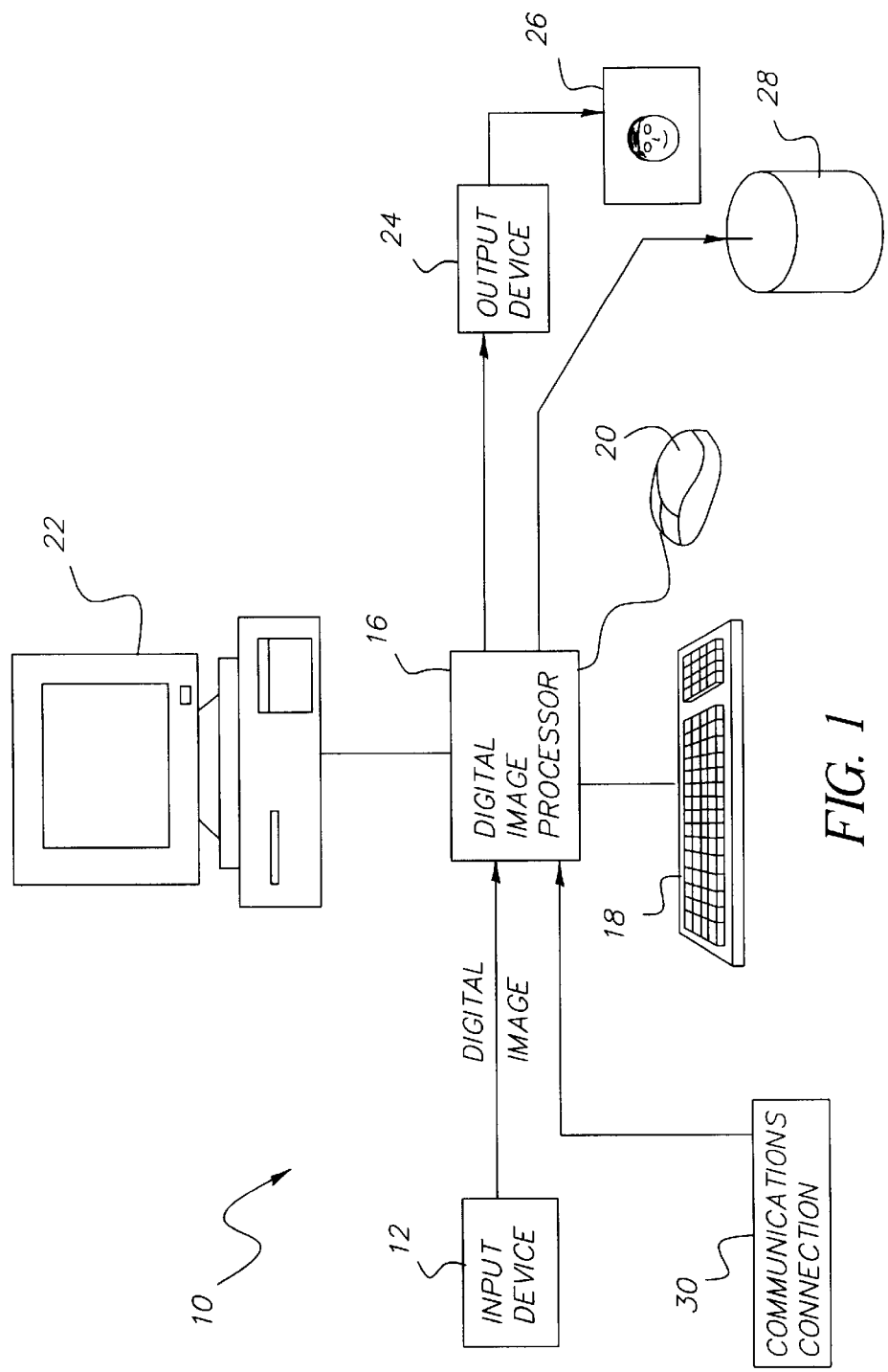
FIG. 1 is a schematic block diagram illustrating an image processing system suitable for performing the image processing method of the present invention.

Referring to FIG. 1, an image processing system, generally designated 10 suitable for performing the image processing method of the present invention includes for example an input device 12 for producing a digital image, such as a scanner for scanning photographic film or prints, or a digital camera. Alternatively, digital images may be sourced from a digital data storage device and accessed via the World Wide Web. The input device 12 produces a digital image signal having a plurality of color channels (e.g. red, green and blue) that is supplied to a digital image processor 16. The digital image processor is a programmed computer and can be for example a general purpose digital computer such as a PC, or minicomputer, or a computer that is specially designed for processing digital images. The digital image processor 16 is provided with operator interface devices such as a keyboard 18 and a mouse 20. The system 10 may include display devices, connected to the digital image processor 16, such as a color monitor 22 and a output device 24, such as a color hardcopy printer (e.g. an ink jet or thermal printer) for producing a color hard copy print 26 of the processed digital image. The system may also include a digital image store 28, such as an optical disk storage unit for storing the processed images, and a communications connection 30, such as a modem, for communicating the images to a remote location.

Figure 2:
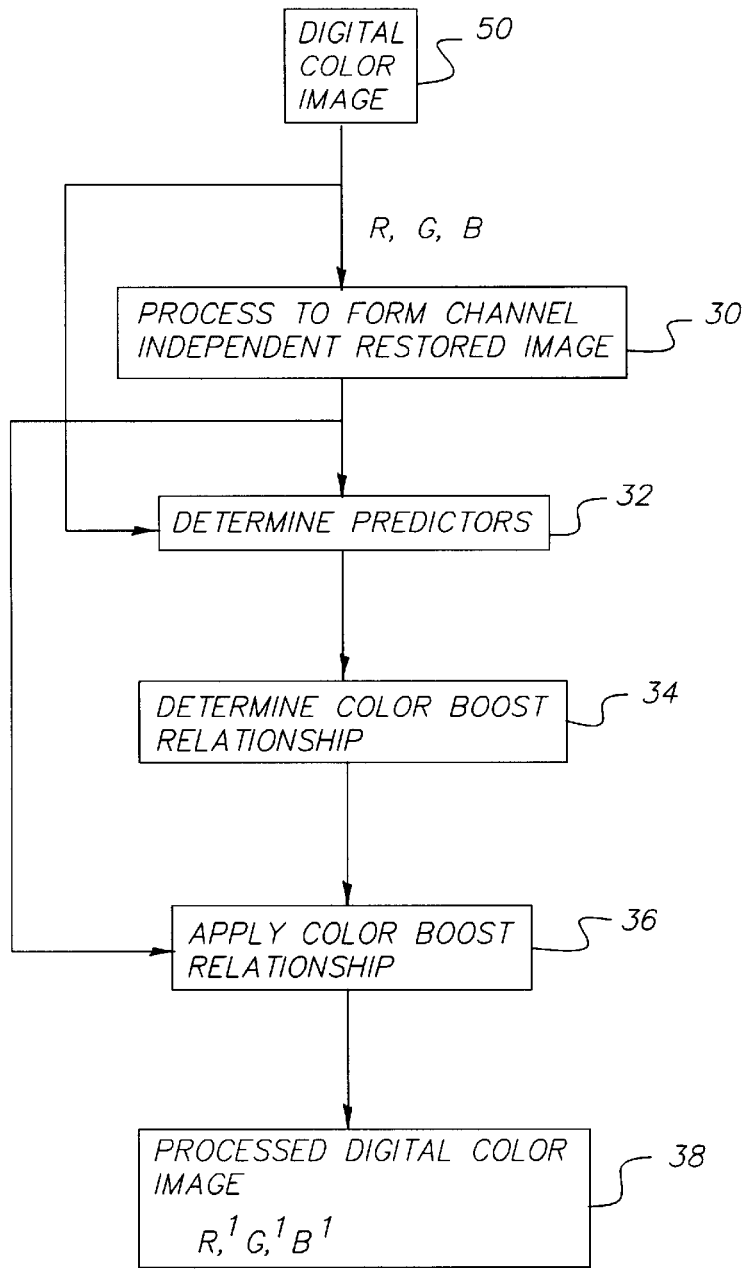
FIG. 2 is a schematic diagram illustrating the digital image processing method according to the present invention.

Referring to FIG. 2, the image processing method of the present invention includes the steps of providing so a digital color image having pixels and a plurality of color channels and processing 31 the digital color image to provide a channel independent restored digital image. The method described in U.S. patent application Ser. No. 09/650,422 is such a channel independent method. Other examples of channel independent methods include those taught in U.S. Pat. Nos. 5,555,022, 4,984,071, 5,062,058, and 5,812,286.

Next, predictors are determined (32) from the digital color image and/or the channel independent restored digital image. Predictors are chosen based or their ability to identify digital images where saturation boost is desired. Preferred predictors include.

Preferred predictors based on the channel independent restored image include predictors that are global in that information from all of the pixels are used, and predictors that result from using data from a pixel that represents the maximum or minimum of a certain determination.

An example global predictor is the ratio of the standard deviation of luminance representation of the digital color image divided by the mean length of the chrominance vector. The dynamic range of the image is normalized by using the standard deviation of this luminance representation, W, which is defined as:

$$W = x \cdot R + y \cdot G + (1-x-y) \cdot B \qquad (1)$$

where R, G, and B are, respectively, the red, green, and blue digital color image and x and y are weighting factors each greater than zero and their sum less than one. When x and y both equal ⅓, then the luminance representation is an equal weighting of red, green, and blue. The standard deviation, $\sigma_W$, of the luminance representation is calculated by well known statistical methods and is:

$$\sigma_W = \sqrt{\frac{\sum (W - \overline{W})^2}{(n-1)}} \qquad (2)$$

where n is the number of elements, e.g. pixels, used to calculate the mean of the luminance representation, $\overline{W}$ and the summation is over all pixels in the image.

There are various ways to represent a chrominance vector which is defined as an absolute value deviation from neutral where all three code values are equal. An example representation for a chrominance vector, C, is:

$$C = \sqrt{(R-W)^2 + (G-W)^2 + (B-W)^2} \qquad (3)$$

and the average chrominance vector, $\overline{C}$ defined as:

$$\overline{C} = \frac{\sum C}{n} \qquad (4)$$

The predictor, $P_1$, will have a lower value when the standard deviation of the luminance representation has low value and the average chrominance vector has high value:

$$P_1 = K_1 \frac{\sigma_W}{\overline{C}} \qquad (5)$$

where $K_1$ is a weighting factor for predictor $P_1$.

Another example of a global predictor, $P_2$, is defined as:

$$P_2 = \frac{K_2}{\overline{W} \cdot \min(\sigma_{(R-W)}, \sigma_{(G-W)}, \sigma_{(B-W)})} \qquad (6)$$

where $K_2$ is a weighting factor for predictor $P_2$ and the min( ) operation selects the minimum standard deviation among three color minus luminance signals, R-W, G-W, and B-W.

An example predictor resulting from a maximum or minimum determination based on analysis of all pixel values is $P_3$ with weighting factor $K_3$:

$$P_3 = \frac{K_3}{\max(|R-G|, |G-B|, |B-R|)} \qquad (7)$$

and the max( ) operation selects the maximum absolute value color difference among the red, green, and blue color values at each pixel and then maximum of these pixel level maximums among all pixels in the image.

Another example predictor resulting from a maximum or minimum determination is based on a determination that limits, or alternatively eliminates overflow or underflow by utilizing the relationship among all three color values at each pixel. Examination of the uniform color boost equation:

$$\begin{vmatrix} R' \\ G' \\ B' \end{vmatrix} = \begin{vmatrix} 1+2 \cdot s & -s & -s \\ -s & 1+2 \cdot s & -s \\ -s & -s & 1+2 \cdot s \end{vmatrix} \cdot \begin{vmatrix} R \\ G \\ B \end{vmatrix} \qquad (8)$$

where s is the uniform boost that is applied to the input R, G, and B values resulting in the output R', G', and B' values.

To avoid overflow, all of the 3 values R', G', and B' must not overflow either above a maximum value $V_{max}$ or below a minimum value $V_{min}$. There are 6 possibilities for the relationship among the red, green, and blue values:

$$R > G, B \qquad (9a)$$

$$G > R, B \qquad (9b)$$

$$B > R, G \qquad (9c)$$

$$R < G, B \qquad (9d)$$

$$G < R, B \qquad (9e)$$

$$B < R, G \qquad (9f)$$

Examining 9a and matrix equation 8, maximum value overflow is controlled if the following inequality is satisfied:

$$\frac{1}{s} > \frac{2 \cdot R - G - B}{V_{max} - R} \qquad (10a)$$

Similar inequalities that result from 9b and 9c are:

$$\frac{1}{s} > \frac{2 \cdot G - R - B}{V_{max} - G} \qquad (10b)$$

and $$\frac{1}{s} > \frac{2 \cdot B - G - R}{V_{max} - B} \qquad (10c)$$

Equations 10a, 10b, and 10c are evaluated as equalities at every pixel and the maximum value of 1/s from these 3 equalities is chosen to limit the value of s that causes maximum value overflow.

In a similar manner, by examining 9d, minimum value overflow is controlled if the following inequality is satisfied:

$$\frac{1}{s} > \frac{2 \cdot R - B - G}{V_{min} - R} \qquad (10d)$$

Similar inequalities that result from 9e and 9f are:

$$\frac{1}{s} > \frac{2 \cdot G - R - B}{V_{min} - G} \qquad (10e)$$

$$\frac{1}{s} > \frac{2 \cdot B - R - B}{V_{min} - B} \qquad (10f)$$

Equations 10d, 10e, and 10f are evaluated as equalities at every pixel and the maximum value of 1/s from these 3 equalities is chosen to limit the value of s that causes minimum value overflow.

As maximum overflow resulting from a saturation boost is oftentimes more visually objectionable than a minimum overflow, the maximum value of 1/s based on the equality form of equations 10a, 10b and 10c forms a useful predictor. Also, as some, but controlled, overflow may be desirable and given that this predictor can be used in combination with other predictors, such as those previously described, the values for $V_{min}$ and $V_{max}$ are typically set to be a few code values beyond the maximum and minimum code value limits. This is also computationally useful as this avoids a division by zero should the value of R, G, or B equal the minimum or maximum code value limit.

An example predictor $P_4$, based on limiting the maximum value overflow is:

$$P_4 = \frac{K_4}{\left(\frac{1}{s}\right)_{max}} \quad (11)$$

and $K_4$ is a weighting factor for predictor $P_4$ and $(1/s)_{max}$ is the maximum value, base on evaluating 10a, 10b and 10c as equalities at every pixel in the image.

Yet another predictor $P_5$ utilizes a spatially filtered highpass frequency representation of the chrominance signals:

$$P_5 = F\{\max[(R-W)_{highpass}, (G-W)_{highpass}, (B-W)_{highpass}]\} \quad (12)$$

where $F\{x,y,z\}$ is a function such as forming the average or calculating the maximum value of three arguments x, y, z, $(R-W)_{highpass}$, $(G-W)_{highpass}$, and $(B-W)$ are spatially filtered, preferably with zero response at zero spatial frequency chrominance signals and $K_5$ is a normalizing constant. As was the case with predictor $P_1$ the performance of other predictors may be enhanced by normalizing by the standard deviation $\sigma_W$ of the luminance representation.

As this is a predictor and not an operator on the image, a spatial highpass filter as simple as a one-dimensional differentiator can be used. For similar reasons, all of the above predictors can be determined from low spatial resolution representation of the digital image. Low spatial resolution representation have the advantage of requiring fewer computations to calculate a predictor and have the additional benefit of reducing any contribution of noise in calculating the predictors.

The above described predictors can be used individually or preferably in combination to determine a final s value to applied as a uniform color boost. Those skilled in the art will appreciate that methods that combine (including linear and non-linear models,) predictor values in order to better predict aim s values can be used. An example combination was determined by calculating the above described predictors for images where the uniform color boost, s, was determined by manually adjusting s for each image until image quality was optimum for that image. Details for this example combination, as applied to a digital imaging system wherein values range from 0 to 255 are:

$$S = -0.0005 + 0.0173 \cdot P_1 + 0.0313 \cdot P_2 - 0.0116 \cdot P_3 - 0.0037 \cdot P_4 + 0.0002 \cdot P_4^2 - 0.0005 \cdot P_1 \cdot P_2 \cdot P_4 \quad (13)$$

where S is the boost factor to be applied to generate the color boost relationship using an equation like equation (8):

$$\begin{vmatrix} R' \\ G' \\ B' \end{vmatrix} = \begin{vmatrix} 1+2\cdot S & -S & -S \\ -S & 1+2\cdot S & -S \\ -S & -S & 1+2\cdot S \end{vmatrix} \cdot \begin{vmatrix} R \\ G \\ B \end{vmatrix} \quad (14)$$

As equation (13) contains negative coefficients and product terms, it is desirable to limit the output such that S is greater than or equal to zero and S less than a high limit such as S less than 1.0.

The following values were used in calculating the predictors used in equation (13):

$K_1 = 1.0$ $K_2 = 100.0$ $K_3 = 100.0$ $K_4 = 1.0$

The color boost relationship is applied 36 on a pixel by pixel basis to the channel independent restored image 30 to produce the color restored processed digital color image R'G'B' 38.

In addition to the above detailed examples of masks other masks based on spatial frequency content or other digital image processing of pixel data, image statistics and the like can be used to further improve the performance of the method. Furthermore, additional predictors may be based on parameters derived from the initial channel independent restoration step and/or the original, non channel independent restored image.

The present invention is useful for example for correcting the color reproduction of images that have experienced dye fading, images that were exposed under water or with tungsten or fluorescent illumination using daylight balanced film, or images derived from photographic prints that were incorrectly printed.

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention. Computer readable storage medium may include, for example: magnetic storage media such as a magnetic disc (e.g. a floppy disc) or magnetic tape; optical storage media such as optical disc or optical tape; bar code; solid state electronic storage devices such as random access memory (RAM) or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST 10 image processing system
12 input device
16 digital image processor
18 keyboard
20 mouse
22 color monitor
24 output device
26 color hardcopy print
28 digital image store
30 communications connection
31 forming channel dependent restored image step
32 determining predictors image step
34 determining color boost relationship step
36 applying color boost relationship step
38 processed digital color image
50 digital color image

What is claimed is:

1. A method of processing a digital color image comprising the steps of:

providing a digital color image having pixels and a plurality of color channels;

processing the image to provide a channel independent restored digital image;

determining at least one predictor derived from the channel independent restored digital image or the digital color image;

determining a channel interdependent color boost relationship from the at least one predictor; and applying the color boost relationship on a pixel by pixel basis to the respective channels of the digital color image to produce a processed digital color image.

2. The method of claim 1 wherein said color channels of said provided digital color image are red, green and blue.

3. The method of claim 1 wherein said at least one predictor $P_1$ is $$P_1 = K_1 \frac{\sigma_W}{C}$$

where $W$ is a luminance representation, $\sigma_W$ is a standard deviation of a luminance representation, C is a chrominance vector, and $K_1$ is a very weighting factor for $P_1$.

4. The method of claim 3 wherein W is defined as $$W = x \cdot R + y \cdot G + (1-x-y) \cdot B$$

where R, G and B are, respectively the red, green and blue digital color channels; and where x and y are weighting factors, each greater than zero and x+y is less than 1.

5. The method of claim 4 wherein x and y both equal ⅓ and W is consequently an equal weighting of R, G, B.

6. The method of claim 3 where $$\sigma_W = \sqrt{\frac{\sum (W - \overline{W})^2}{(n-1)}}$$

where n is the number of pixels used to calculate the mean $\overline{W}$, of the luminance representation W and the summation is over all pixels in the color image.

7. The method of claim 3 where $$P_3 = \frac{K_3}{\max(|R-G|, |G-B|, |B-R|)}.$$

8. The method of claim 1 wherein said at least one predictor $P_2$ is $$P_2 = \frac{K_2}{\overline{W} \cdot \min(\sigma_{(R-W)}, \sigma_{(G-W)}, \sigma_{(B-W)})}$$

where $K_2$ is a weighting factor for $P_2$ and the min ( ) operation selected the minimum standard deviation σ among three color minus luminance signals, R-W, G-W, B-W.

9. The method of claim 1 wherein said at least one predictor $P_3$ is $$P_3 = \frac{K_3}{\max(|R-G|, |G-B|, |B-R|)}$$

where $K_3$ is a weighting factor and the max ( ) operation selects the maximum absolute value color difference among the red, green and blue color values at each pixel, and then maximum of these pixel level maximums among all pixels of the color image.

10. The method of claim 1 wherein the channel interdependent color boost relationship is $$\begin{vmatrix} R' \\ G' \\ B' \end{vmatrix} = \begin{vmatrix} 1+2 \cdot s & -s & -s \\ -s & 1+2 \cdot s & -s \\ -s & -s & 1+2 \cdot s \end{vmatrix} \cdot \begin{vmatrix} R \\ G \\ B \end{vmatrix}$$

where s is the uniform boost applied to the input R, G, B values resulting in the output R', G', B' values.

11. The method of claim 10 wherein the predictor limits the values R', G', B' to be no greater than a maximum value $V_{max}$ or no less than a minimum value $V_{min}$.

12. The method of claim 11 wherein R>G, B and $V_{max}$ is not exceeded when $$\frac{1}{s} > \frac{2 \cdot R - G - B}{V_{max} - R}.$$

13. The method of claim 11 wherein G>R, B and $V_{max}$ is not exceeded when $$\frac{1}{s} > \frac{2 \cdot G - R - B}{V_{max} - G}.$$

14. The method of claim 11 wherein B>R, G and $V_{max}$ is not exceeded when $$\frac{1}{s} > \frac{2 \cdot B - G - R}{V_{max} - B}.$$

15. The method of claim 11 wherein R<G, B and $V_{min}$ is not exceeded when $$\frac{1}{s} > \frac{2 \cdot R - B - G}{V_{min} - R}.$$

16. The method of claim 11 wherein G<R, B and $V_{min}$ is not exceeded when $$\frac{1}{s} > \frac{2 \cdot G - R - B}{V_{min} - G}.$$

17. The method of claim 11 wherein B<R, G and $V_{min}$ is not exceeded when $$\frac{1}{s} > \frac{2 \cdot B - R - G}{V_{min} - B}.$$

* * * * *